United States Patent
Hong et al.

(10) Patent No.: US 9,182,973 B2
(45) Date of Patent: Nov. 10, 2015

(54) DEVICE AND METHOD FOR SMART DEVICE AND SENSOR NODE INTEGRATED APPLICATION UPDATE

(71) Applicant: Electronics and Telecommunications Research Institute, Daejeon (KR)

(72) Inventors: Sang Gi Hong, Daejeon (KR); Byung Bog Lee, Daejeon (KR); Jeong Gil Ko, Daejeon (KR); Nae Soo Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/171,183

(22) Filed: Feb. 3, 2014

(65) Prior Publication Data

US 2015/0007164 A1  Jan. 1, 2015

(30) Foreign Application Priority Data

Jun. 26, 2013 (KR) .................. 10-2013-0073939

(51) Int. Cl.
G06F 9/44 (2006.01)
G06F 9/445 (2006.01)

(52) U.S. Cl.
CPC .......................... *G06F 8/65* (2013.01)

(58) Field of Classification Search
None
See application file for complete search history.

(56) References Cited

U.S. PATENT DOCUMENTS

| | | | |
|---|---|---|---|
| 5,911,075 A * | 6/1999 | Glaser et al. .................. 717/100 |
| 5,950,010 A * | 9/1999 | Hesse et al. .................. 717/178 |
| 6,701,356 B1 * | 3/2004 | Condict et al. ................ 709/220 |
| 7,945,642 B1 * | 5/2011 | Hung et al. .................... 709/219 |
| 2003/0120655 A1 * | 6/2003 | Ohwada et al. .................. 707/9 |
| 2003/0229890 A1 * | 12/2003 | Lau et al. ...................... 717/168 |
| 2004/0215754 A1 * | 10/2004 | Orleth et al. .................. 709/223 |
| 2009/0164480 A1 * | 6/2009 | Lappetelainen et al. ...... 707/100 |
| 2011/0225574 A1 * | 9/2011 | Khalidi et al. ................ 717/168 |
| 2013/0219381 A1 * | 8/2013 | Lovitt ........................... 717/173 |

FOREIGN PATENT DOCUMENTS

KR  10-0951622 B1  4/2010
KR  2010-0052882 A  5/2010

OTHER PUBLICATIONS

Chih-Chieh Han, Ram Kumar, Roy Shea, and Mani Srivastava. 2005. Sensor network software update management: a survey. Int. J. Netw. Manag. 15, 4 (Jul. 2005), 283-294.*

(Continued)

*Primary Examiner* — James D Rutten
(74) *Attorney, Agent, or Firm* — Rabin & Berdo, P.C.

(57) ABSTRACT

Provided is a device and a method for smart device and sensor node integrated application update, including an application program updating device including a generator to generate a package in a storage space by installing a sensing application, an extractor to extract an installation file and a profile of an application program interworking with the sensing application from the package, a recognizer to recognize a sensor node by referring to the profile, an installer to install the application program by transmitting the installation file to the sensor node, and an executor to execute the application program and the sensing application when the application program is installed in the sensor node.

16 Claims, 4 Drawing Sheets

(56) References Cited

OTHER PUBLICATIONS

D'Elia, M.G.; Paciello, V., "Sensors uncertainty on an Android smart phone," Instrumentation and Measurement Technology Conference (I2MTC), 2012 IEEE International, vol., No., pp. 698,702, May 13-16, 2012 doi: 10.1109/I2MTC.2012.6229460.*

Gamez, Nadia, Javier Cubo, Lidia Fuentes, and Ernesto Pimentel. 2012. "Configuring a Context-Aware Middleware for Wireless Sensor Networks." Sensors (14248220) 12, No. 7: 8544. Publisher Provided Full Text Searching File, EBSCOhost (accessed Dec. 24, 2014).*

Rohit Chaudhri, Waylon Brunette, Mayank Goel, Rita Sodt, Jaylen VanOrden, Michael Falcone, and Gaetano Borriello. 2012. Open data kit sensors: mobile data collection with wired and wireless sensors. In Proceedings of the 2nd ACM Symposium on Computing for Development(ACM DEV '12). ACM, New York, NY, USA, Article 9, 10 pages.*

\* cited by examiner

DEVICE AND METHOD FOR SMART DEVICE AND SENSOR NODE INTEGRATED APPLICATION UPDATE

CROSS-REFERENCE TO RELATED APPLICATION

This application claims the priority benefit of Korean Patent Application No. 10-2013-0073939, filed on Jun. 26, 2013, in the Korean Intellectual Property Office, the disclosure of which is incorporated herein by reference.

BACKGROUND

1. Field of the Invention

The present invention relates to technology for installing or updating an application program of a sensor node for providing a personalized service by interworking with various sensor nodes.

2. Description of the Related Art

Recently, the development of a sensing application that may receive sensing information from a sensor node and provide a personalized service to various fields such as medicine, security, and the like is in progress. Changing the sensor node based on the sensing application may be possible and thus, a smart device user may make use of various sensing applications.

However, limitations of installing a new application program that may control the sensor node when the sensor node is changed, and a need for the sensor node to be updated by a retailer, exist.

Accordingly, there is a desire for a technology that automatically installs an application program provided in a package of a sensing application in a corresponding sensor node when the sensing application is installed.

SUMMARY

The present invention provides a device and a method for updating a smart device and sensor node integrated application that may download an application program integrated and developed with a sensing application from an application market, and update a sensor node.

The present invention also provides a device and a method for updating the smart device and sensor node integrated application that may use a profile prepared in a process of developing a sensing application and an application program, and recognize a sensor node.

According to an aspect of the present invention, there is provided an application program updating device, including a generator to generate a package in a storage space by installing a sensing application, an extractor to extract an installation file and a profile of an application program interworking with the sensing application from the package, a recognizer to recognize a sensor node by referring to the profile, an installer to install the application program by transmitting the installation file to the sensor node, and an executor to execute the application program and the sensing application when the application program is installed in the sensor node.

According to another aspect of the present invention, there is provided a method of updating an application program, including generating a package in a storage space by installing a sensing application, extracting an installation file and a profile of an application program interworking with the sensing application from the package, recognizing a sensor node by referring to the profile, installing the application program by transmitting the installation file to the sensor node, and executing the application program and the sensing application when the application program is installed in the sensor node.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Reference will now be made in detail to exemplary embodiments of the present invention, examples of which are illustrated in the accompanying drawings, wherein like reference numerals refer to the like elements throughout. Exemplary embodiments are described below to explain the present invention by referring to the accompanying drawings, however, the present invention is not limited thereto or restricted thereby.

When it is determined a detailed description related to a related known function or configuration that may make the purpose of the present invention unnecessarily ambiguous in describing the present invention, the detailed description will be omitted. Also, terminology used herein is defined to appropriately describe the exemplary embodiments of the present invention and thus may be changed depending on a user, the intent of an operator, or a custom. Accordingly, the terminology must be defined based on the following overall description of this specification.

Figure 1:
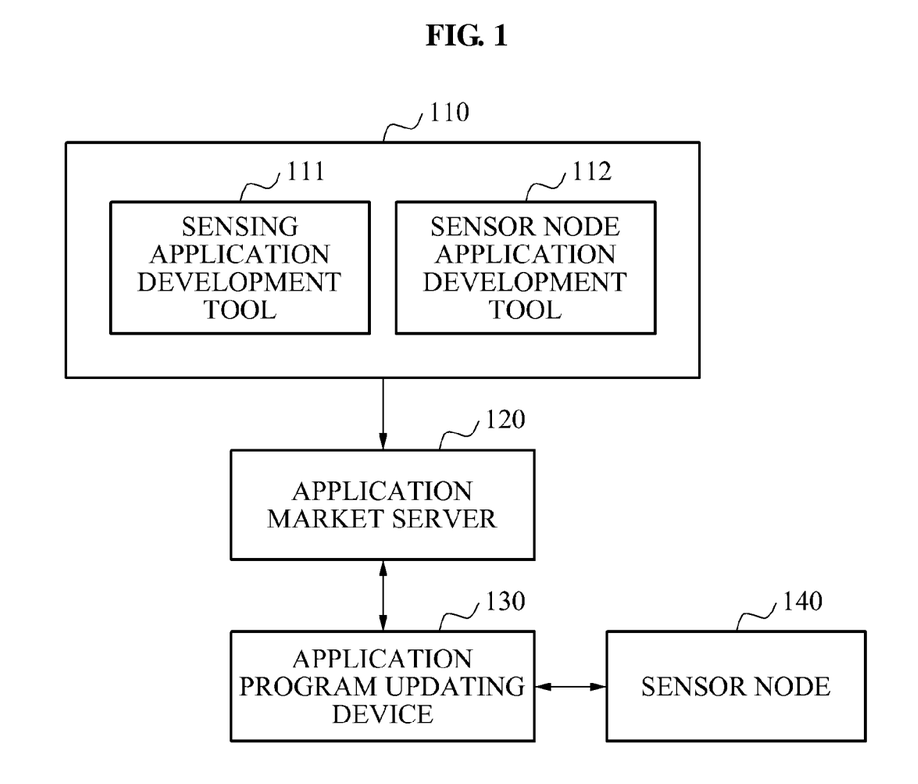
FIG. 1 is a diagram illustrating a configuration of an application program updating device according to an embodiment of the present invention.

FIG. 1 is a diagram illustrating a configuration of an application program updating device 130 according to an embodiment of the present invention.

Referring to FIG. 1, the application program updating device 130 may download a sensing application from an application market server 120. The sensing application may provide a service based on sensing information measured by a sensor node 140.

The application market server 120 may register various sensing applications based on a type of the sensor node 140 and provide the various sensing applications to the application program updating device 130. The application program updating device 130 may be a smart device of which a function may be changed or expanded through an application including the sensing application.

A sensing application development tool 111 may provide an environment in which the sensing application may be executed based on a programming language, and include a complier, a debugger, a configuration manager, and a developer library. The sensing application development tool 111 may be actuated in a host 110 to enable a developer to prepare the programming language and to correct an error. The sensing application development tool 111 may include a virtual sensing application test environment implementing a platform of the application program updating device 130 to test the sensing application.

The sensor node 140 may measure sensing information based on hardware settings. The sensing information may denote a physical quantity of light, temperature, sound, and the like, and measurable sensing information may differ based on a type of the sensor node 140. The sensor node 140 may be controlled by an application program and transmit the sensing information to the application program updating device 130.

A sensor node application development tool 112 may provide an environment in which the application program may be executed based on a programming language, and also include the complier, the debugger, the configuration manager, and the developer library with the sensing application development tool 111. The sensor node application development tool 112 may be actuated, by being integrated with the sensing application development tool 111, in the host 110, and the application program may be determined to be included, as an installation file, in part of the sensing application.

The application program updating device 130 may generate a package in a storage space based on a package structure determined in the sensing application development tool 110 during a process of installing the sensing application, and store the installation file in the package.

When an installation of the sensing application is completed, the application program updating device 130 may recognize the sensor node 140, and transmit the installation file to the sensor node 140, and transmit a command for installing the application program and a command for starting the application program. When the application program is installed in the sensor node 140, the application program updating device 130 may execute the sensing application and the application program, and receive the sensing information from the sensor node 140.

Figure 2:
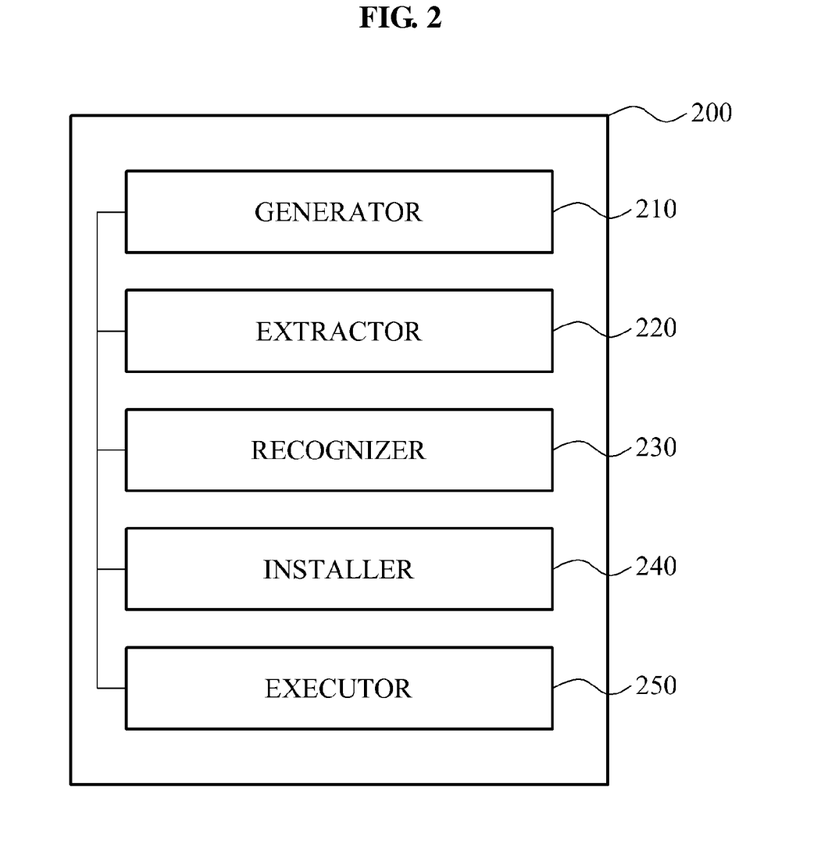
FIG. 2 is a diagram illustrating configuration of an application program updating device according to another embodiment of the present invention.

FIG. 2 is a diagram illustrating a configuration of an application program updating device 200 according to another embodiment of the present invention.

Referring to FIG. 2, the application program updating device 200 may include a generator 210, an extractor 220, a recognizer 230, an installer 240, and an executor 250.

A function of the application program updating device 200, as a smart device, may be extended to a form of a smart television (TV), a smartphone, a smart tablet, and the like, by installing an application providing a function such as Internet communication and information retrieval.

The application program updating device 200 may install a sensing application, communicate with a sensor node installed around the sensing application, and provide a service based on sensing information received from the sensor node. The application program updating device 200 may utilize the sensing information associated with heat, light, temperature, pressure, sound, and the like through the sensing application.

The generator 210 may download the sensing application from an application market server, install the sensing application, and generate a package in a storage space. The application market server may register and sell various sensing applications that may be loaded on the application program updating device 200. The sensing application may be searched for in the application market server based on an operating system for the application program updating device 200 and a type of the sensing information.

The generator 210 may generate the package based on a package structure defined in a sensing application development tool and store a file in which the sensing application is executed. As used herein, the package may refer to a single directory, and be distributed and installed conveniently based on the package structure.

The generator 210 may generate a plurality of sub-directories in the package based on the package structure, and classify and store the file. For example, the generator 210 may generate a directory in which a file associated with a code of the sensing application may be stored and a directory in which remaining files may be stored, in the package.

The generator 210 may designate at least one of the sub-directories, assign a storage right and an access right to the sub-directories, and store an installation file and a profile of the application program in the at least one of the directories.

The application program may be integrated and developed with the sensing application to provide sensing information to the application program updating device 200 by interworking with the sensing application. The sensing application and the application program may be developed based on a type of a sensor node installed around the application program updating device 200. The application program may be subordinate to the sensing application and installed in the sensor node. For example, in a case of developing a sensing application used to control a light switch using a light detecting sensor node, the sensing application may be integrated with an application program in which the sensor node processes sensing information and transmits the sensing information to the application program updating device 200. The profile may include information of the sensor node jointly controlled by the sensing application and the application program and be prepared in an integrated development environment in which the sensing application development tool and the sensor node application development tool interwork with one another.

The generator 210 may download a new sensing application from the application market server when the sensor node is changed and update the package.

The extractor 220 may extract the installation file and the profile of the application program from the package.

The extractor 220 may be granted access to the designated directory in the package, search for a list of files in the designated directory, verify extensions and names of the files, and extract the installation file and the profile. The extractor 220 may verify whether the files are the installation file or the profile based on the extensions and the names, and identify each file when several application programs interworking with the sensing application exist.

The recognizer 230 may recognize a sensor node by referring to the profile.

The recognizer 230 may use a wireless protocol and receive node information from a node present within a communication range of the wireless protocol, determine whether the node information matches the profile, and recognize the node as the sensor node.

The recognizer 230 may use a wireless protocol including at least one of Bluetooth, Wireless Fidelity (WiFi), and WiFi Direct or use a wireless protocol such as 802.15.4 based on an installation of a protocol conversion dongle.

When hardware information, software information, and interface information provided in each of the node information and the profile are identical, the recognizer 230 may determine that the node information matches the profile.

The installer 240 may transmit the installation file to the recognized sensor node and install the application program.

The installer 240 may detect a status of the sensor node, determine whether transmission of the installation file is completed, transmit a command for installing the application program to the sensor node after the transmission of the installation file is completed, and install the application program.

The executor 250 may execute the application program and the sensing application after the application program is installed in the sensor node.

The executor 250 may transmit a command for starting the application program to the sensor node, and subsequent to the application program controlling a sensor installed in the sensor node and processing sensing information measured by the sensor, receive the sensing information, and provide the sensing information to the sensing application.

Figure 3:
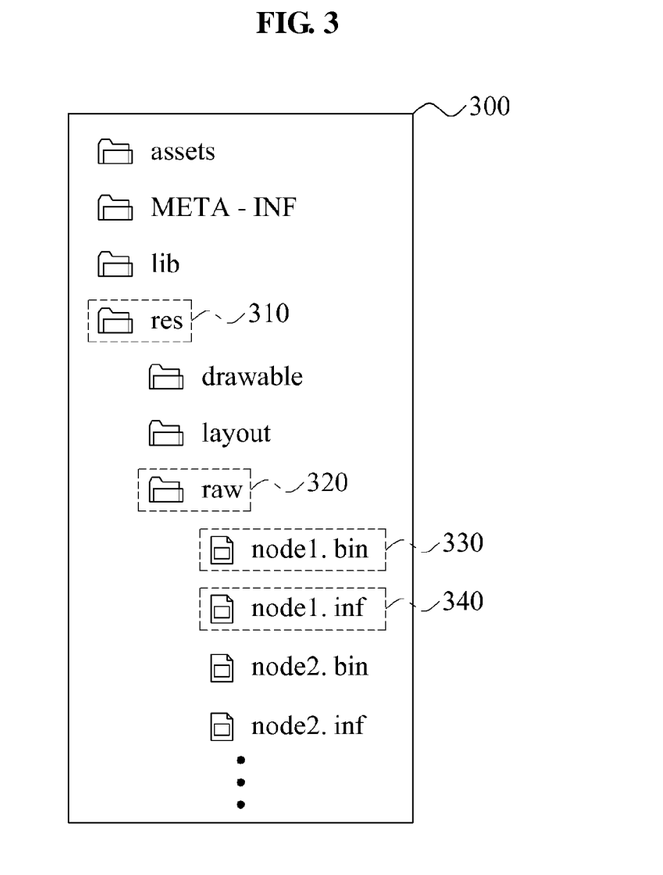
FIG. 3 is a diagram illustrating a package of a sensing application according to an embodiment of the present invention.

FIG. 3 is a diagram illustrating a package 300 of a sensing application according to an embodiment of the present invention.

Referring to FIG. 3, an application program updating device may download the sensing application from an application market server, install the sensing application, and generate the package 300 in a storage space. For example, the application program updating device may install a sensing application that may detect and control moisture of a potted plant based on sensing information about humidity. In this example, at least one sensor node measuring the sensing information may be installed adjacent to the application program updating device.

The application updating device may generate a plurality of sub-directories, for example, assets, META-INF, lib, and res 310 in the package 300 based on a package structure defined in a sensing application development tool, and generate a plurality of sub-directories, for example, drawable, layout, and raw 320 in the res 310.

The application program updating device may designate the res 310 and the raw 320 among the generated directories, assign a storage right and an access right to the designated directories, and store an installation file 330 and a profile 340 of the application program.

The application program updating device may extract the installation file 330 and the profile 340 from the package 300.

As shown in FIG. 3, the application program updating device may search for a list of files in the designated directories, the res 310 and the raw 320, in the package 300, verify extensions and names of the files, and extract the installation file 330 and the profile 340. Also, the application program updating device may be granted access to the res 310 first, then to the raw 320 in the res 310, and extract the installation file 330 existing at an uppermost position.

Here, the installation file 330 may be identified by the extensions, for example, bin, and the names, for example, node 1. Also, the application program may extract the profile 340 having an identical name to the installation file 330. The profile 340 may have an extension, for example, .inf, and a name, for example, node 1.

The application program updating device may refer to the profile 340 and recognize a sensor node.

The application program updating device may use a wireless protocol and receive node information from a node present within a communication range of the wireless protocol, determine whether the node information matches the profile 340, and recognize the node as the sensor node. When hardware information, software information, and interface information provided in each of the node information and the profile 340 are identical, the application program updating device may determine that the node information matches the profile 340.

The application program updating device may transmit the installation file 330 to the recognized sensor node and install the application program.

Although FIG. 3 illustrates an example of the package 300 of the sensing application, it may be obvious that a directory and a file name provided in the package 300 may differ based on an operating system (OS) of a smart device and a user definition.

Figure 4:
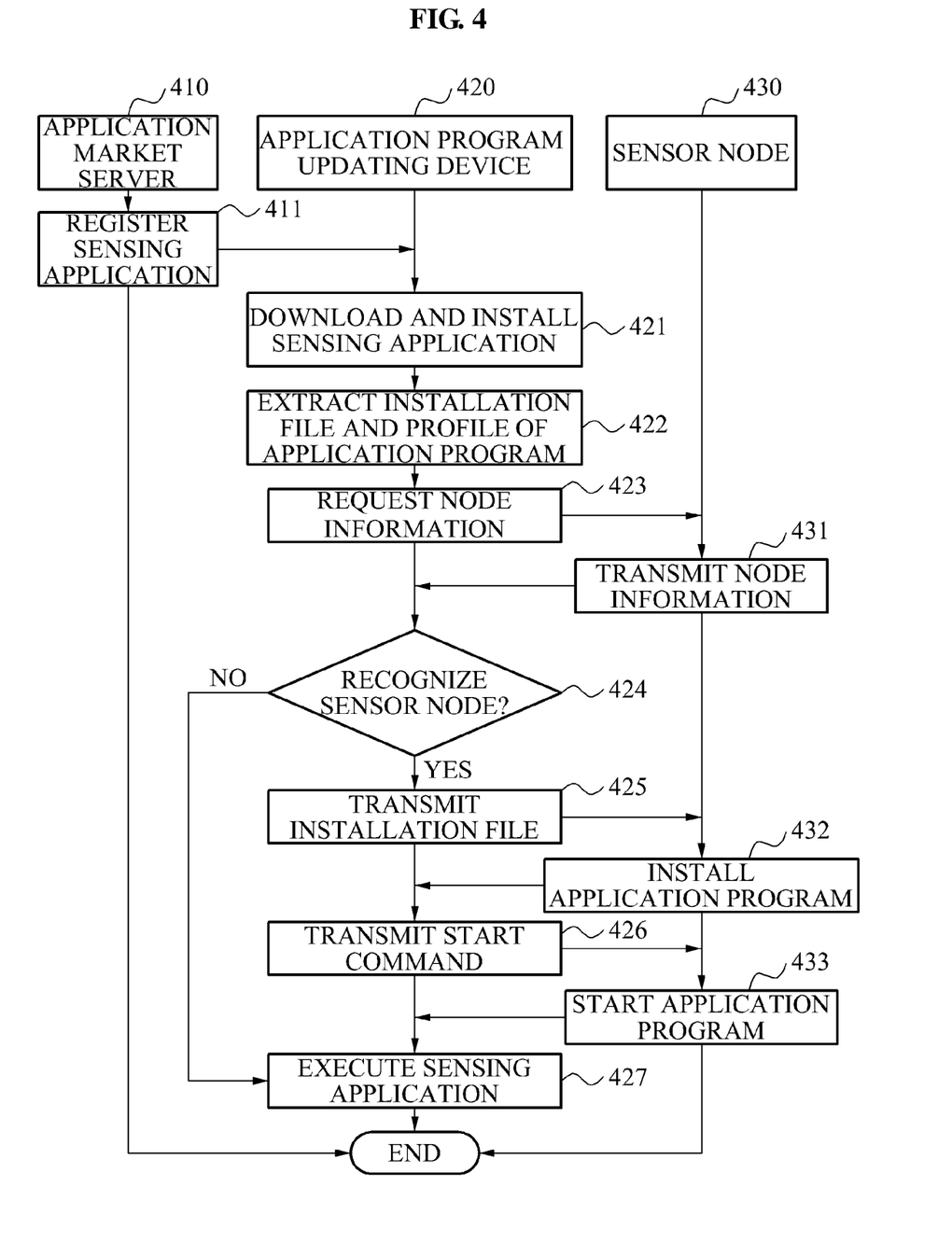
FIG. 4 is a flowchart illustrating a method of updating an application program according to an embodiment of the present invention.

FIG. 4 is a flowchart illustrating a method of updating an application program according to an embodiment of the present invention.

Referring to FIG. 4, in operation 411, an application market server 410 may register various sensing applications that may be loaded on an application program updating device 420. The application market server 410 may search for a sensing application based on an OS of the application program updating device 420 and a type of sensing information.

In operation 421, the application program updating device 420 may download the sensing application, install the sensing application, and generate a package in a storage space. The application program updating device 420 may generate the package based on a package structure defined in a sensing application development tool and store a file in which the sensing application is executed.

The application program updating device 420 may generate a plurality of sub-directories in the package based on the package structure, and classify and store the file. Also, the application program updating device 420 may designate at least one of the sub-directories, assign a storage right and an access right to the directory, and store an installation file and a profile of the application program.

The application program may be integrated with the sensing application to provide the sensing information to the application program updating device 420 by interworking with the sensing application. The sensing application and the application program may be developed based on a type of a sensor node installed adjacent to the application program updating device 420. The application program may be subordinate to the sensing application and installed in the sensor node. Also, when the sensing application and the application program are integrated, the profile including information of the sensor node may be prepared.

The application program updating device 420 may download a new sensing application from the application market server when the sensor node is changed and update the package.

In operation 422, the application program updating device 420 may extract the installation file and the profile of the application program from the package.

The application program updating device 420 may be granted access to the designated directory in the package, search for a list of files provided in the directory, verify extensions and names of the files, and extract the installation file and the profile.

In operation 423, the application program updating device 420 may use a wireless protocol and request node information to a node present within a communication range of the wireless protocol. The node may transmit the node information in operation 431, and the application program updating device 420 may recognize the sensor node 430 by determining whether the node information matches the profile in operation 424. When hardware information, software information, and interface information provided in each of the node information and the profile are identical, the node information may match the profile.

When the node information matches the profile, the application program updating device 420 may transmit the installation file to the recognized sensor node in operation 425, and the sensor node 430 may receive a command for installing the application program along with the installation file and install the application program in operation 432.

When the application program is installed in the sensor node 430, the application program updating device 420 may transmit a command for starting the application program in operation 426 and the sensor node 430 may start the application program in operation 433.

When the sensor node 430 is not recognized, for example, in a No direction of operation 424, the application program updating device 420 may execute the sensing application in operation 427 and provide a service using sensing information measured by the sensor node 430.

According to an embodiment of the present invention, an update of a sensor node sold and installed to provide a personalized service may be performed using a method of installing a sensing application.

According to an embodiment of the present invention, an existing sensor node may be applied to various services without an aid of a specialized apparatus.

The above-described exemplary embodiments of the present invention may be recorded in non-transitory computer-readable media including program instructions to execute various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM discs and DVDs; magneto-optical media such as floptical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A smart device and sensor node integrated application program updating device, the device comprising:
   a generator configured to
      download a sensing application from an application market server, and
      install the sensing application to thereby generate a package, including a plurality of directories, in a storage space based on a predetermined package structure, and to store, in at least one of the plurality of directories, an installation file and a profile of an application program interworking with the sensing application;
   an extractor configured to extract, from the at least one of the plurality of directories, the installation file and the profile;
   a recognizer configured to recognize a sensor node by referring to the profile;
   an installer configured to transmit the installation file to the sensor node; and
   an executor configured to cause the sensor node to execute the application program and to execute the sensing application after the application program is installed in the sensor node, so that the sensing application interworks with the application program, wherein
   the profile comprises information of a sensor node jointly controlled by the sensing application and the application program, and is prepared in an integrated development environment in which a sensing application development tool and a sensor node application development tool interwork with one another.

2. The device of claim 1, wherein the generator assigns a storage right and an access right to the at least one of the plurality of directories.

3. The device of claim 1, wherein the generator downloads a new sensing application from the application market server when the sensor node is changed.

4. The device of claim 1, wherein the extractor searches for a list of files stored in the package, verifies extensions and names of the files, and extracts the installation file and the profile.

5. The device of claim 1, wherein the recognizer uses a wireless protocol, receives node information from a node present within a communication range of the wireless protocol, determines whether the node information matches the profile, and recognizes the sensor node.

6. The device of claim 5, wherein, when hardware information, software information, and interface information comprised in each of the node information and the profile are identical, the recognizer determines that the node information matches the profile.

7. The device of claim 1, wherein the installer detects a status of the sensor node, determines whether a transmission of the installation file is completed, transmits a command for installing the application program to the sensor node after the transmission of the installation file is completed, and enables the application program to be installed in the sensor node.

8. The device of claim 1, wherein
   the executor transmits a command for starting the application program to the sensor node, and
   subsequent to the application program controlling a sensor installed in the sensor node and processing sensing information, the executor receives the sensing information and executes the sensing application.

9. A method of updating a smart device and sensor node integrated application program, the method comprising:
   downloading a sensing application from an application market server, and installing the sensing application to thereby generate a package, including a plurality of directories, in a storage space based on a predetermined package structure, and to store, in at least one of the plurality of directories, an installation file and a profile of an application program interworking with the sensing application;
   extracting, from the at least one of the plurality of directories, the installation file and the profile;
   recognizing a sensor node by referring to the profile;
   transmitting the installation file to the sensor node; and
   causing the sensor node to execute the application program and executing the sensing application after the application program is installed in the sensor node, so that the sensing application interworks with the application program, wherein
   the profile comprises information of a sensor node jointly controlled by the sensing application and the application program, and is prepared in an integrated development environment in which a sensing application development tool and a sensor node application development tool interwork with one another.

10. The method of claim 9, wherein the storing comprises assigning a storage right and an access right to the at least one of the plurality of directories.

11. The method of claim 9, wherein the generating comprises downloading a new sensing application from the application market server when the sensor node is changed.

12. The method of claim 9, wherein the extracting comprises searching for a list of files stored in the package, verifying extensions and names of the files, and extracting the installation file and the profile.

13. The method of claim 9, wherein the recognizing comprises using a wireless protocol, receiving node information from a node present within a communication range of the wireless protocol, determining whether the node information matches the profile, and recognizing the sensor node.

14. The method of claim 13, wherein the recognizing further comprises determining that the node information matches the profile when hardware information, software information, and interface information comprised in each of the node information and the profile are identical.

15. The method of claim 9, wherein the enabling comprises detecting a status of the sensor node, determining whether a transmission of the installation file is completed, transmitting a command for installing the application program to the sensor node after the transmission of the installation file is completed, and enabling the application program to be installed in the sensor node.

16. The method of claim 9, wherein the executing comprises transmitting a command for starting the application program to the sensor node, and subsequent to the application program controlling a sensor installed in the sensor node and processing sensing information, receiving the sensing information and executing the sensing application.

* * * * *